US007982924B2

(12) United States Patent
Endo et al.

(10) Patent No.: US 7,982,924 B2
(45) Date of Patent: Jul. 19, 2011

(54) IMAGE READING DEVICE

(75) Inventors: Takafumi Endo, Chiyoda-ku (JP); Yohei Nokami, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 208 days.

(21) Appl. No.: 12/466,761

(22) Filed: May 15, 2009

(65) Prior Publication Data

US 2009/0310192 A1 Dec. 17, 2009

(30) Foreign Application Priority Data

Jun. 11, 2008 (JP) ................................ 2008-153093

(51) Int. Cl.
*H04N 1/04* (2006.01)

(52) U.S. Cl. ......... 358/474; 358/475; 358/486; 358/482

(58) Field of Classification Search .................. 358/474, 358/475, 486, 482, 487, 496, 497
See application file for complete search history.

(56) References Cited

U.S. PATENT DOCUMENTS

| | | | | |
|---|---|---|---|---|
| 5,489,992 | A * | 2/1996 | Endo | 358/482 |
| 6,969,838 | B2 * | 11/2005 | Endo et al. | 250/208.1 |
| 7,859,726 | B2 * | 12/2010 | Endo et al. | 358/474 |
| 2002/0015145 | A1 | 2/2002 | Numata | |
| 2006/0187676 | A1 | 8/2006 | Ishikura | |
| 2007/0133858 | A1 | 6/2007 | Endo et al. | |
| 2007/0165286 | A1 | 7/2007 | Endo et al. | |
| 2007/0216976 | A1 | 9/2007 | Endo et al. | |

(Continued)

FOREIGN PATENT DOCUMENTS

EP 1 239 423 A2 9/2002

(Continued)

OTHER PUBLICATIONS

Office Action issued Oct. 26, 2010, in China Patent Application No. 200910145441X (with English-language Translation).

(Continued)

*Primary Examiner* — Houshang Safaipour
(74) *Attorney, Agent, or Firm* — Oblon, Spivak, McClelland, Maier & Neustadt, L.L.P.

(57) ABSTRACT

A compact image reading device is provided in which a plurality of illumination devices are not needed, and by which a hologram image can be accurately identified in a short period. The image reading device includes a first light source, arranged in a main-scanning direction on a face perpendicular to the conveying direction, for emitting light having a plurality of wavelengths, a second light source, arranged, in parallel to the first-light-source arrangement, on the same face on which the first light source is provided, or in the periphery thereof, for emitting light having a plurality of wavelengths, a light guide for guiding light from the first and second light sources in a sub-scanning direction, and the light guide, having total reflection faces whose illumination angles are different from each other, for irradiating a portion, of a hologram region, to be irradiated with light after totally reflected by the reflection faces, a lighting control means for controlling in a time division manner an exposure ratio between light quantities incident on the total reflection faces of the light guide, a lens assembly for focusing reflection light reflected by a reflective portion of a target positioned at the portion to be light-irradiated, and a sensor for receiving, for each divided time, light focused by the lens assembly, whereby the device is configured to enable detection of the hologram region in the target.

13 Claims, 18 Drawing Sheets

U.S. PATENT DOCUMENTS

2008/0304121 A1 12/2008 Endo et al.

FOREIGN PATENT DOCUMENTS

| | | |
|---|---|---|
| JP | 11-215301 | 8/1999 |
| JP | 2001-357429 | 12/2001 |
| JP | 2002-260051 | 9/2002 |
| JP | 2005-5275 | 1/2005 |
| JP | 2007-87757 | 4/2007 |
| JP | 2007-194797 | 8/2007 |
| JP | 2007-249475 | 9/2007 |

OTHER PUBLICATIONS

U.S. Appl. No. 12/466,808, filed May 15, 2009, Endo, et al.

* cited by examiner

300DPI: 1872／600DPI: 3744

(a) Wide-angle light irradiation (b) Narrow-angle light irradiation

IMAGE READING DEVICE

TECHNICAL FIELD

The present invention relates to image reading devices, used for image reading or image identification, in copy machines or financial terminals.

BACKGROUND ART

An image reading device for reading image information is, for example, disclosed in FIG. 1 of Japanese Patent Application Publication Laid-Open No. 2007-249475 (referred to as Patent Document 1), by which an image included in a hologram region of a target to be light-irradiated is read out using a white light source, etc., and the target is determined to be true or false.

Another image reading device is disclosed in FIG. 1 and paragraph [0035] of Japanese Patent Application Publication Laid-Open No. H11-215301 (referred to as Patent Document 2), which is configured in such a manner that two slants 16*a* and 16*b* whose slant angles are different from each other are provided midway along a light-irradiation channel 14 sandwiched between two internal walls 15*a* and 15*b*, the slants are positioned above LED chips 6, and the light-irradiation channel is made to approach an image reading region S as approaching the top.

However, in the device disclosed in Patent Document 1, first light sources 4 that irradiate a portion 3*a*, to be irradiated with light, of a hologram region, and second light sources 6 that irradiate a portion 3*b*, to be irradiated with light, of the hologram region after having been conveyed by a predetermined amount thereof are provided; therefore, a problem has occurred that not only illumination units are needed to be arranged at positions different from each other in its conveying direction, but also, because reading of the same pixels is performed after a certain time has elapsed, a target to be irradiated with light has to be accurately conveyed.

In the device disclosed in Patent Document 2, by providing LED chips 6 in the lower portion of a light emitting channel 14, and by reflecting light, emitted from the LED chips 6, at slants 16*a* and 16*b* arranged above the chips, an image reading region S positioned at the top of the device is illuminated; therefore, a problem has occurred that, because its light-traveling path is long in a heightwise direction, the device size is comparatively large.

SUMMARY OF THE INVENTION

An objective of the present invention, which is made to solve the above described problem, is to provide a compact image reading device in which a plurality of illumination devices are not needed, a hologram image, etc. is accurately identified in a short period, and, even if irregularity of conveying a target to be irradiated with light occurs, deterioration of image quality is reduced.

According to a first aspect of the present invention, an image reading device includes a conveying means for conveying in a conveying direction a target to be light-irradiated including a hologram region; a first light source, arranged in a main-scanning direction on a face perpendicular to the conveying direction, for emitting light having a plurality of wavelengths; a second light source, arranged, in parallel to the first-light-source arrangement, on the same face on which the first light source is provided, or in the periphery thereof, for emitting light having a plurality of wavelengths; a light guide for guiding light from the first and second light sources in a sub-scanning direction, and said light guide, having total reflection faces whose illumination angles are different from each other, for irradiating a portion, of the hologram region, to be irradiated with light after totally reflected by the reflection faces; a lighting control means for controlling in a time-division manner an exposure ratio between light quantities incident on the total reflection faces of the light guide; a lens assembly for focusing reflection light reflected by a reflective portion of the target positioned at the portion to be light-irradiated; and a sensor for receiving, for each divided time, light focused by the lens assembly.

According to a second aspect of the present invention, an image reading device as recited in the first aspect, wherein the optical-axis centers of the first and the second light sources are positioned at their respective total reflection face-centers of the light guide.

According to a third aspect of the present invention, an image reading device as recited in the first aspect, wherein spectra of the first and the second light sources are identical to each other.

According to a fourth aspect of the present invention, an image reading device as recited in the first aspect, wherein the lighting control means controls the light exposure ratio such that, when one of the first and the second light sources is lighted on, the other one is lighted off.

According to a fifth aspect of the present invention, an image reading device as recited in the first aspect, wherein the light guide, a portion of which around the portion to be light-irradiated is removed, includes a cutaway portion having the total reflection faces each tilted by angles different from each other and a flat face for transmitting therethrough the reflection light reflected by the portion to be light-irradiated.

According to a sixth aspect of the present invention, an image reading device includes a conveying means for conveying in a conveying direction a target to be light-irradiated including a hologram region; a first light source, arranged in a main-scanning direction on a face perpendicular to the conveying direction, for emitting light having a plurality of wavelengths; a second light source, arranged, in parallel to the first-light-source arrangement, on the same face on which the first light source is provided, or in the periphery thereof, for emitting light having a plurality of wavelengths; a third light source, plane-symmetrically placed to face the first light source, for emitting light, whose spectrum is identical to that of the first light source, in the direction opposite to that of the first light source; a fourth light source, plane-symmetrically placed to face the second light source, for emitting light, whose spectrum is identical to that of the second light source, in the direction opposite to that of the second light source; a light guide for guiding light from the first to fourth light sources in a sub-scanning direction, and said light guide, having total reflection faces whose illumination angle of light guided from the first and the third light sources and that from the second and the fourth light sources are different from each other, for irradiating a portion, of the hologram region, to be irradiated with light after totally reflected by the reflection faces; a lighting control means for controlling in a time division manner an exposure ratio among light quantities incident on the total reflection faces of the light guide; a lens assembly for focusing reflection light reflected by a reflective portion of the target positioned at the portion to be light-irradiated; and a sensor for receiving, for each divided time, light focused by the lens assembly.

According to a seventh aspect of the present invention, an image reading device as recited in the sixth aspect, wherein each optical-axis center of the first to fourth light sources is positioned at each corresponding center of the total reflection faces of the light guide.

According to an eighth aspect of the present invention, an image reading device as recited in the sixth aspect, wherein spectra of the first to fourth light sources are identical to each other.

According to a ninth aspect of the present invention, an image reading device as recited in the sixth aspect, wherein the first and the third light sources are simultaneously lighted on/off, and the second and the fourth light sources are simultaneously lighted on/off.

According to a tenth aspect of the present invention, an image reading device as recited in the ninth aspect, wherein the lighting control means controls the light exposure ratio such that, when one of the sets of the first and third and the second and fourth light sources is lighted on, the other set is lighted off.

According to an eleventh aspect of the present invention, an image reading device as recited in the sixth aspect, wherein the light guide, a portion of which around the portion to be light-irradiated is removed, includes a cutaway portion having the total reflection faces each tilted by angles different from each other and a flat face for transmitting therethrough the reflection light reflected by the portion to be light-irradiated.

According to a twelfth aspect of the present invention, an image reading device includes a first light source, arranged in a main-scanning direction on a face perpendicular to the conveying direction, for emitting light; a second light source, arranged, in parallel to the first-light-source arrangement, on the same face on which the first light source is provided, or in the periphery thereof, for emitting light; a light guide for guiding light from the first and second light sources in a sub-scanning direction, and said light guide, having total reflection faces whose illumination angles are different from each other, for irradiating a portion to be irradiated with light after totally reflected by the reflection faces; a lens assembly for focusing reflection light reflected by a reflective portion of a target, to be light-irradiated, positioned at the portion to be light-irradiated; and a sensor for receiving light focused by the lens assembly.

According to a thirteenth aspect of the present invention, an image reading device includes a conveying means for conveying along a conveying path a target to be light-irradiated; a first light source, arranged in a main-scanning direction on a face perpendicular to the conveying direction, for emitting light; a second light source, arranged, in parallel to the first-light-source arrangement, on the same face on which the first light source is provided, or in the periphery thereof, for emitting light; a light guide for guiding light from the first and second light sources in a sub-scanning direction, and said light guide, having total reflection faces whose illumination angles are different from each other, for irradiating a portion to be irradiated with light after totally reflected by the reflection faces; a lens assembly for focusing reflection light reflected by a reflective portion of the target positioned at the portion to be light-irradiated; and a sensor for receiving light focused by the lens assembly; and the portion to be light-irradiated having a predetermined region generated, in a direction of the optical axis of the lens assembly through which the focusing light passes, by conveying irregularity or conveying-position irregularity of the target, in which light from the second light source is incident on a part of the region near the light guide through the second total reflection face, and light from the first light source is incident on another part of the region far from the light guide through the first total reflection face.

DETAILED DESCRIPTION OF THE PREFERRED EMBODIMENTS

Embodiment 1

Figure 1:
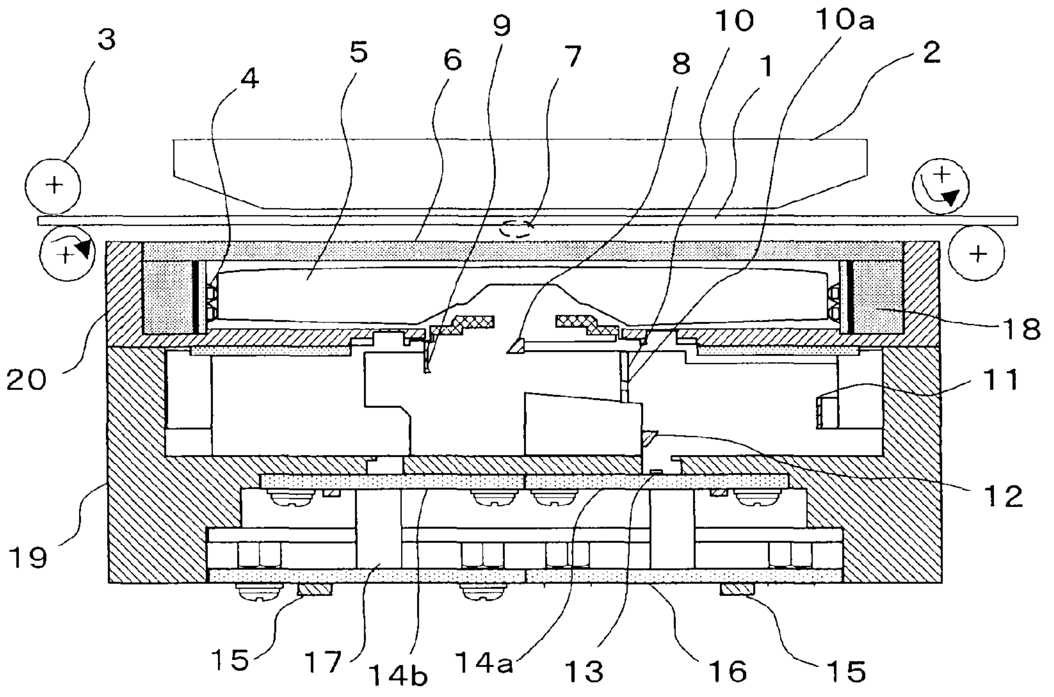
FIG. 1 is a cross-sectional view illustrating an image reading device according to Embodiment 1 of the present invention.

Hereinafter, an image reading device (also referred to as a CIS (contact image sensor)) according to Embodiment 1 of the present invention is explained using FIG. 1. FIG. 1 is a cross-sectional view illustrating the image reading device according to Embodiment 1. In FIG. 1, numeral 1 denotes a target to be light-irradiated such as paper money or a voucher (also referred to as a document); numeral 2 denotes a top board for aligning a route through which the target 1 is conveyed or supporting the target 1; numeral 3 denotes a conveying means such as a roller or a pulley for conveying the target 1; numeral 4 denotes light sources constituted of an LED array or a fluorescent light tube, provided in the main-scanning direction on both faces perpendicular to the conveying direction, for emitting light having a plurality of wavelengths in the sub-scanning direction; numeral 5 denotes a light guide formed of transparent material such as polycarbonate or soda-lime glass through which the light from the light sources 4 is guided in the sub-scanning direction; numeral 6 denotes transparent member formed of transparent glass or transparent plastic, not only for forming the path through which the target 1 is conveyed, but also for preventing contaminant intrusion, etc. into the device; and numeral 7 denotes a portion to be irradiated with light (region to be irradiated with light) for the target 1.

Numeral 8 denotes a first mirror for reflecting, in the sub-scanning direction, light scattered from the light-irradiated portion 7; numeral 9 denotes a concave first-lens mirror for receiving light reflected by the first mirror 8 (also referred to as a first lens, or a first aspherical mirror); numeral 10 denotes an aperture for receiving parallel light from the first lens 9; numeral 10*a* denotes an opening provided on the surface of the aperture 10 or close thereto, whose periphery is light-shielded, and which reduces chromatic aberration of light passing through the aperture 10; numeral 11 denotes a concave second-lens mirror for receiving light passing through the aperture 10 (also referred to as a second lens or a second a spherical mirror); and numeral 12 denotes a second mirror for receiving light from the second lens 11, and for reflecting it.

Numeral 13 denotes MOS-semiconductor sensor ICs (also referred to as sensors) each including an photoelectric conversion circuit and a driver therefor, which receive, through the second mirror 12, light that has passed through the opening 10*a* and been reflected by the second lens 11, to convert the light into an electric signal; and numeral 14 denotes sensor boards on which the sensor ICs 13 are mounted, which are composed of a first sensor board 14*a* and a second sensor board 14*b*. Numeral 15 denotes signal processing ICs (ASICs: application specific integrated circuits) for processing signals obtained after the photoelectric conversion by the sensor ICs 13; numeral 16 denotes signal-processing boards on which the ASICs 15, etc. are mounted; and numeral 17 denotes internal connectors for electrically connecting the sensor boards 14 with the signal-processing boards 16. Numeral 18 denotes heat-radiating blocks formed of aluminum material, etc. by which heat generated by the light sources 4 is dissipated.

Numeral 19 denotes a case for storing a telecentric imaging optical system as an imaging means (lens assembly) configured with a mirror system such as the first mirror 8 and the second mirror 12, and a lens system such as the first lens 9 and the second lens 11. Numeral 20 denotes a case for storing an illumination optical system (illumination unit) such as the light sources 4 and the light guide 5. In this figure, the same numerals represent the same or corresponding elements.

Figure 2:
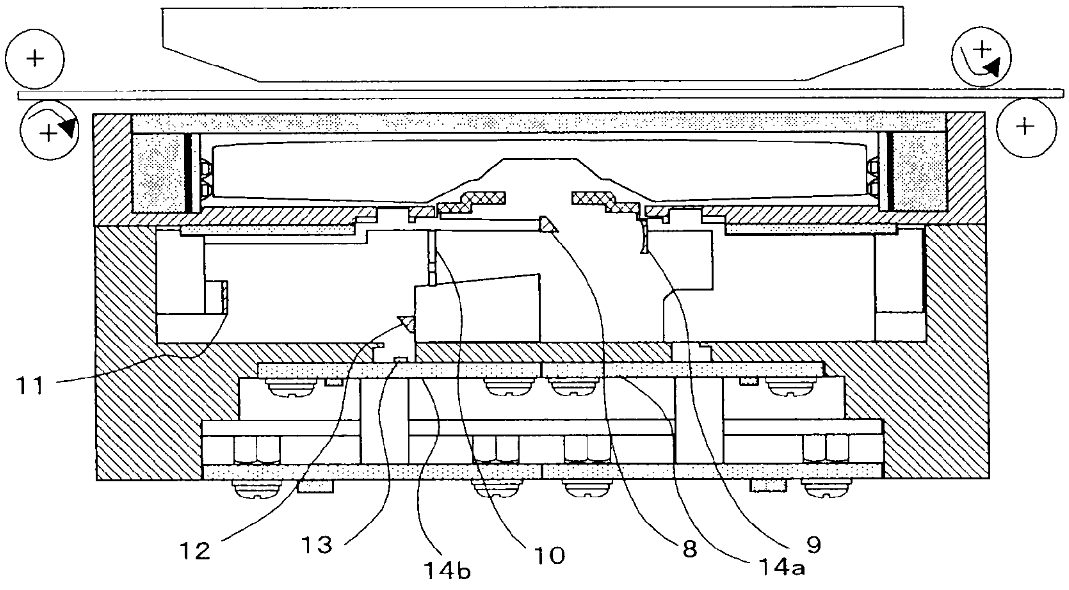
FIG. 2 is a cross-sectional view illustrating the image reading device according to Embodiment 1 of the present invention.

FIG. 2 is a cross-sectional view of the device in the main-scanning direction at a position different from that illustrated in FIG. 1, in which the imaging-optical-system portion that forms the light propagation channel is symmetrical to that illustrated in FIG. 1 with respect to the reading position for every adjacent block. In this figure, the same numerals as those in FIG. 1 represent the same or corresponding elements.

Figure 3:
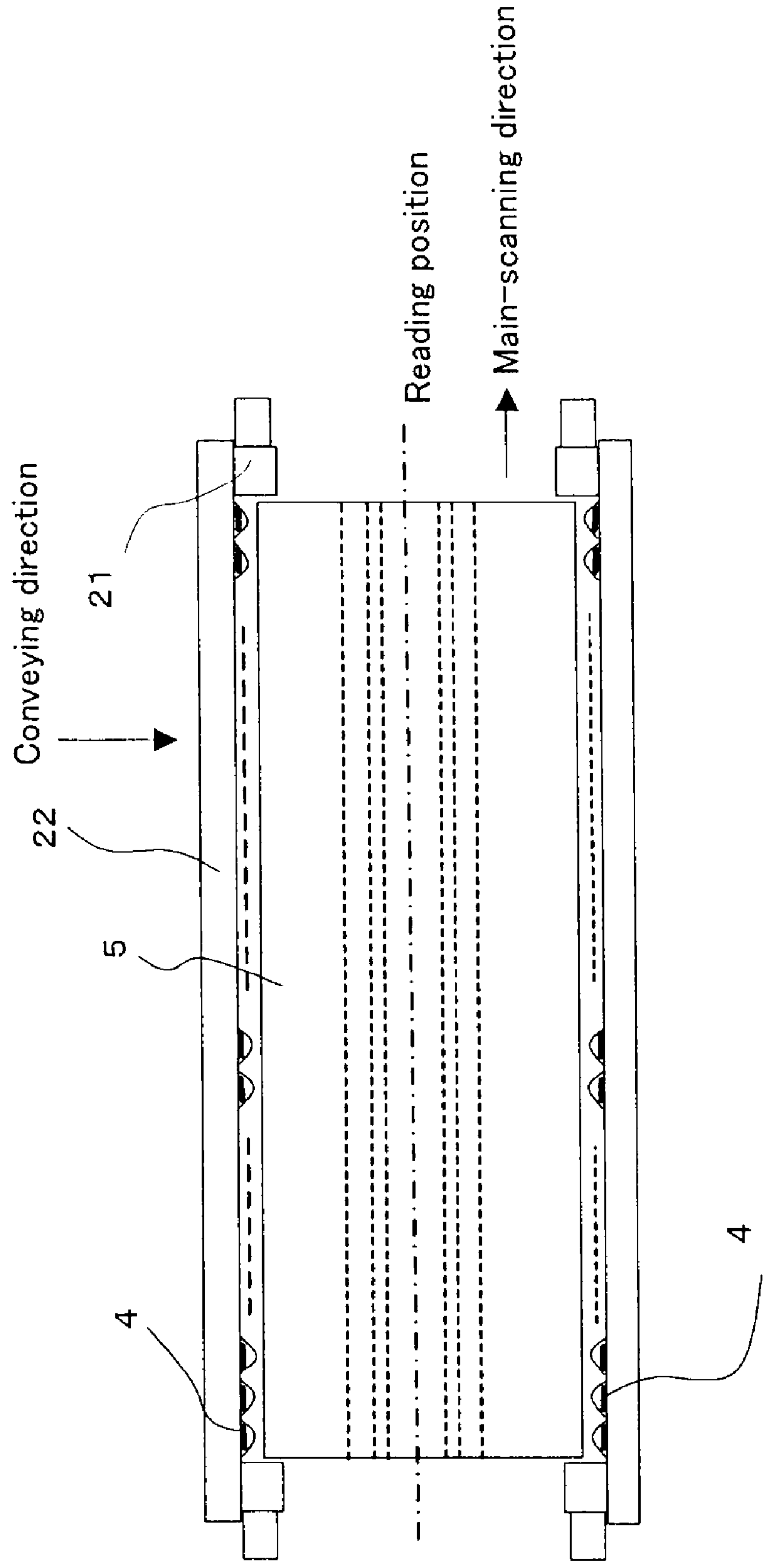
FIG. 3 is a plan view illustrating an illumination optical system of the image reading device according to Embodiment 1 of the present invention.

FIG. 3 is a plan view illustrating the illumination-optical-system portion of the image reading device according to Embodiment 1 of the present invention. In FIG. 3, numeral 21 denotes connectors for supplying to the light sources 4 electric power and control signals; and numeral 22 denotes boards on which the light sources 4 configured with a plurality of white-light-emitting LEDs arranged in an array in the main-scanning direction are mounted.

Figure 4:
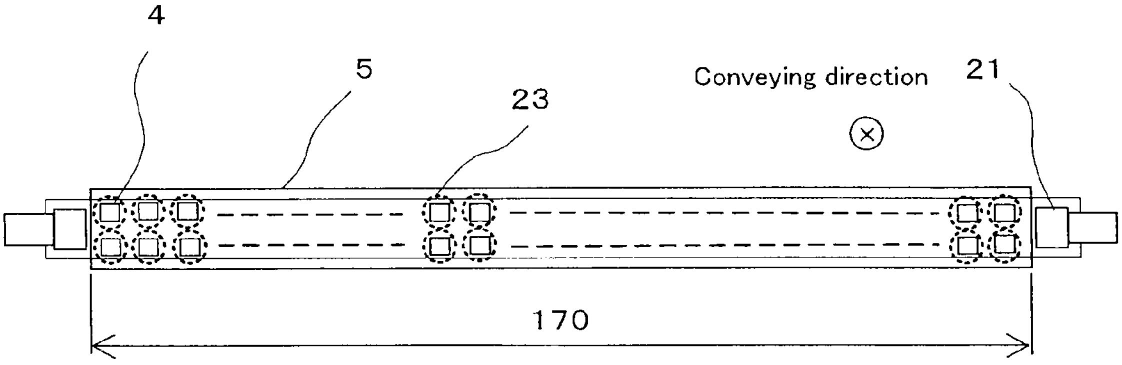
FIG. 4 is a side view, viewed from a reading position, of the illumination optical system installed in the image reading device according to Embodiment 1 of the present invention.

FIG. 4 is a side view, viewed from the reading position, of the illumination-optical-system portion of the image reading device according to Embodiment 1 of the present invention. In FIG. 4, numeral 23 denotes condenser lenses, having light-collection ability in the light-emitting direction of the white-light-emitting LEDs, on which transparent mold resin such as silicone is spot-coated so that the LEDs mounted on the boards 22 are covered, and which serves to limit directionality of the light sources 4 to spread in the sub-scanning direction. Here, in a case of single-wavelength LED chips being used, fluorescent resin that generates fluorescence may be applied to the condenser lenses 23.

Figure 5:
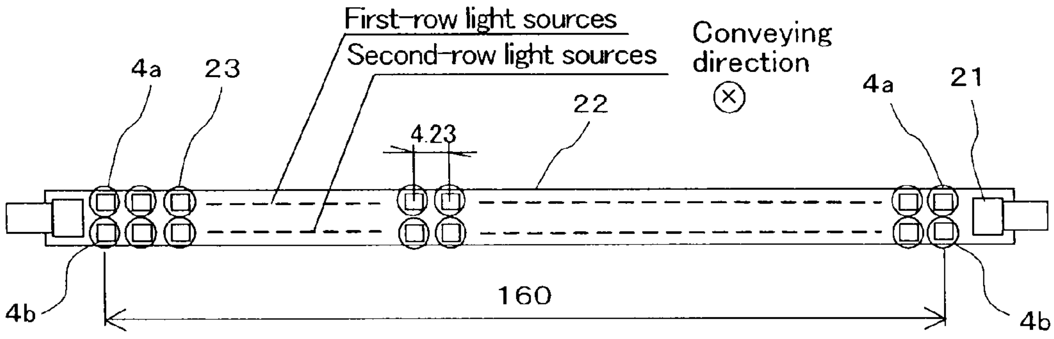
FIG. 5 is a side view, viewed from the reading position, of the illumination optical system, where a light guide is removed, installed in the image reading device according to Embodiment 1 of the present invention.

FIG. 5 is a side view of the illumination-optical-system portion viewed from the reading position, where the light guide is removed, installed in the image reading device according to Embodiment 1 of the present invention. In FIG. 5, numeral 4*a* denotes first-row light sources (first light sources) arranged on a face perpendicular to the conveying direction in an array by the pitch of 4.23 mm; and numeral 4*b* denotes second-row light sources (second light sources) arranged, in parallel to the first-row light sources 4*a*, on the face perpendicular to the conveying direction. In FIG. 3-FIG. 5, the same numerals as those in FIG. 1 represent the same or corresponding elements.

Figure 6:
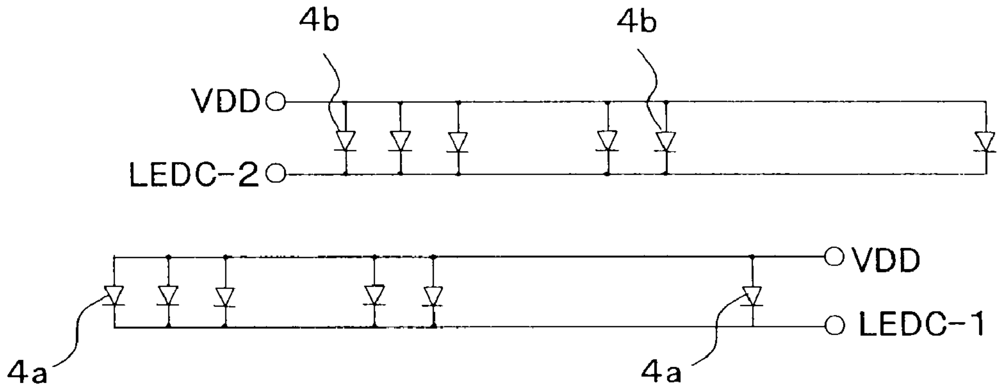
FIG. 6 is a connection diagram illustrating the illumination optical system of the image reading device according to Embodiment 1 of the present invention.

FIG. 6 is a connection diagram illustrating the illumination-optical-system portion of the image reading device according to Embodiment 1 of the present invention. In FIG. 6, regarding the first-row light sources 4*a* and the second-row light sources 4*b* arranged in parallel thereto, independent circuits are formed, and, based on respective control signals from LED-control-signal terminals (LEDC-1 and LEDC-2), electric power is supplied from electric-power supply terminals (VDDs), and thus their lighting-on/off operations are performed.

Figure 7:
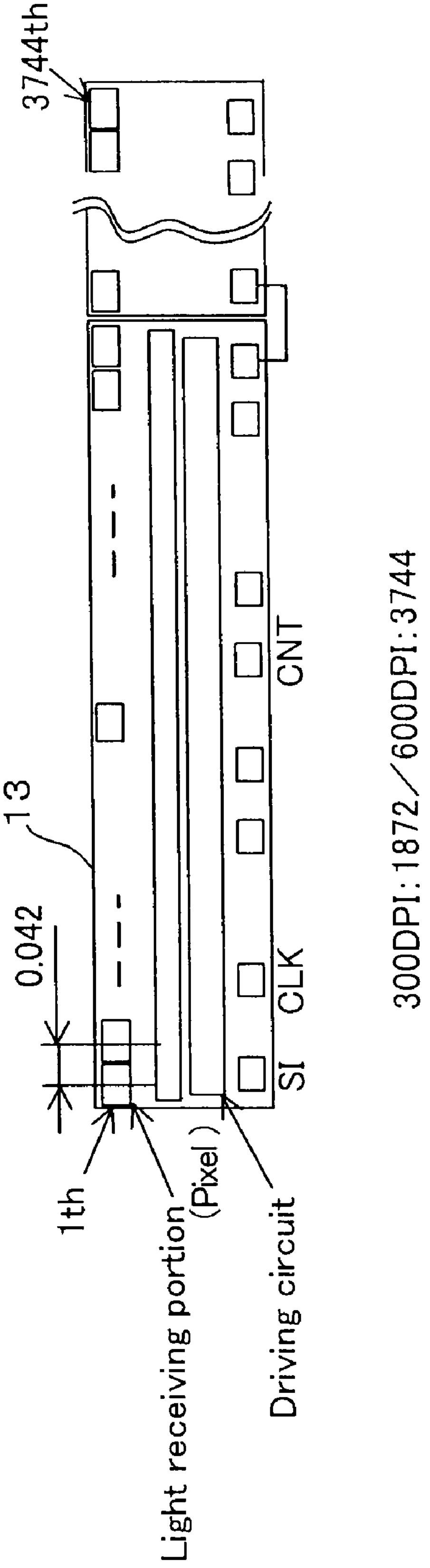
FIG. 7 is a plan view illustrating a sensor IC of the image reading device according to Embodiment 1 of the present invention.
Figure 8:
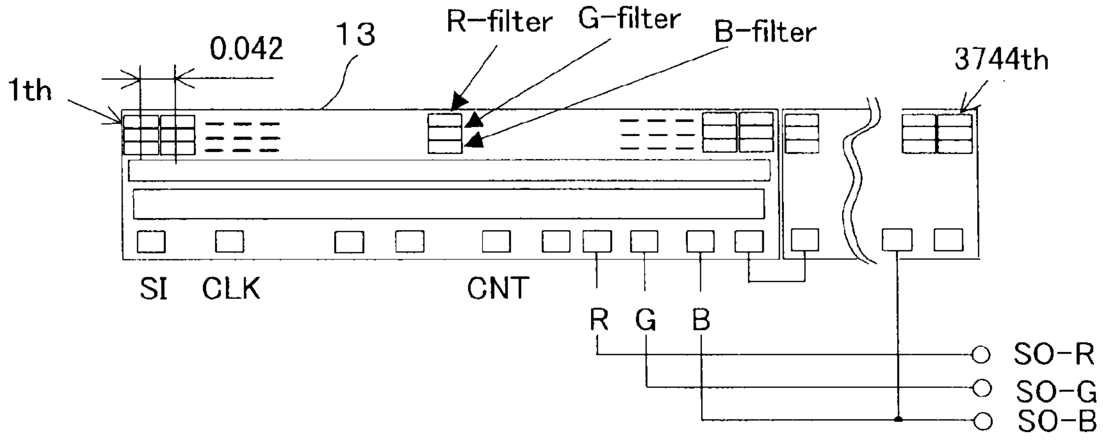
FIG. 8 is a plan view illustrating the sensor IC, to which filters are additionally provided, of the image reading device according to Embodiment 1 of the present invention.

FIG. 7 is a plan view illustrating the sensor ICs 13 mounted on the image reading device. In Embodiment 1, because it is configured in the pixel density of 600 DPI for the reading region of approximately 160 mm, the pixels are arranged in the pitch of approximately 0.042 mm, so as to be 3744 pixels. Additionally, as represented in FIG. 8, each pixel is configured in such a way that RGB filters formed of gelatin, etc., including red (R), green (G), and blue (B) components are arranged on the light receiving face of each sensor IC.

Moreover, a photoelectric-conversion/RGB-shift-register driving circuit (driving circuit) that performs photoelectric conversion of light incident on each pixel for each of R, G, and B components, and that holds its output for register-driving is provided, and wire-bonding pads for inputting into and outputting from the sensor IC 13 signals and electric power are attached. Here, CNTs represent wire-bonding terminals for switching its pixel density (600 DPI/300 DPI), and color/monochrome imaging.

Figure 9:
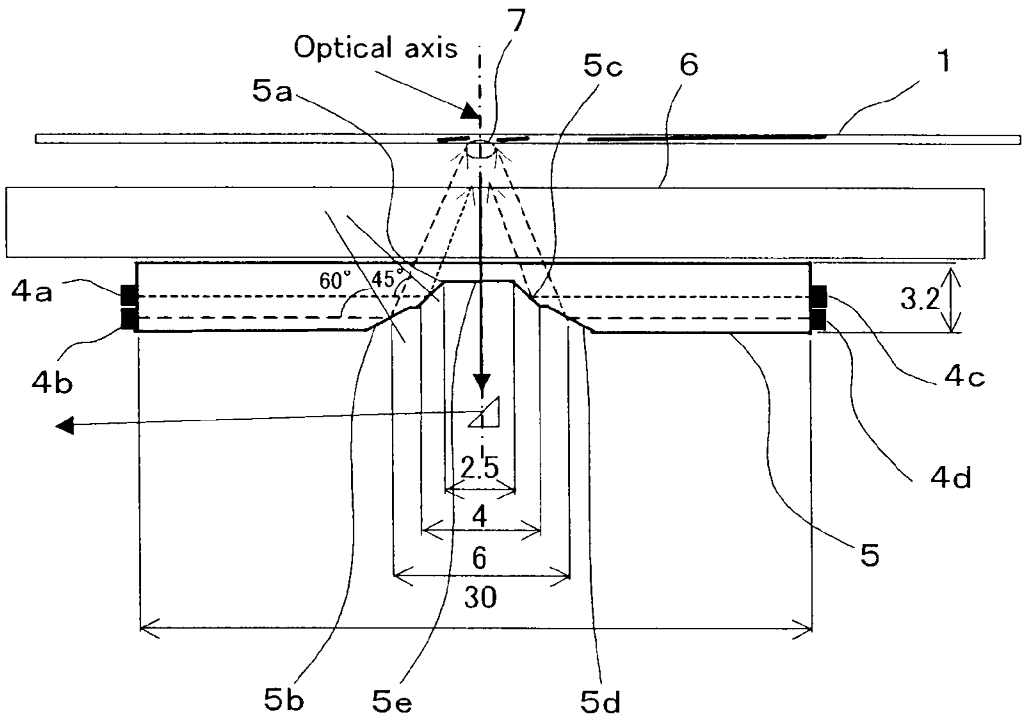
FIG. 9 is a cross-sectional view illustrating the illumination optical system of the image reading device according to Embodiment 1 of the present invention.

FIG. 9 is a cross-sectional view of the illumination optical system for explaining a relationship between the light sources and the light guide of the image reading device according to Embodiment 1 of the present invention. In FIG. 9, numeral 4*a* denotes the first light sources, arranged in the first row, for emitting light in the sub-scanning direction, and numeral 4*b* denotes the second light sources, arranged in the second row, for emitting light in the sub-scanning direction; in contrast, numeral 4*c* denotes third light sources, plane-symmetrically arranged to face the first light sources 4*a*, for emitting light in the direction opposite to that of the first light sources 4*a*, while numeral 4*d* denotes fourth light sources, plane-symmetrically arranged to face the second light sources 4*b*, for emitting light in the direction opposite to that of the second light sources 4*b*.

Numeral 5*a* denotes a first reflection face having the total-reflection-face center along the illumination-optical-axis centers of the first light sources 4*a*; numeral 5*b* denotes a second reflection face having the total-reflection-face center along the illumination-optical-axis centers of the second light sources 4*b*; numeral 5*c* denotes a third reflection face having the total-reflection-face center along the illumination-optical-axis centers of the third light sources 4*c*; numeral 5*d* denotes a fourth reflection face having the total-reflection-face center along the illumination-optical-axis centers of the fourth light sources 4*d*; and numeral 5*e* denotes a flat face through which reflection light reflected by the light-irradiated portion 7 is transmitted.

Here, the total reflection faces 5*a*-5*d* and the flat face 5*e* are formed by cutting away a part of the light guide 5, dose to the light-irradiated portion 7, which is referred to as a cutaway portion of the light guide 5. The total reflection faces 5*a* and 5*b* on one side and the total reflection faces 5*c* and 5*d* on the other side are in a plane-symmetrical relationship. In this figure, the same numerals as those in FIG. 1 represent the same or corresponding elements.

Therefore, each of light fluxes emitted from the light sources 4 passes through the inside of the light guide 5, is totally reflected by each of total reflection faces 5*a*-5*d*, of the light guide 5, provided dose to the light-irradiated portion 7, and irradiates a hologram region. Regarding the total reflection face 5*a*, light mainly from the light sources 4*a* is incident, and because the light is incident at an angle of 45-49 degrees to the normal of the total reflection face 5*a*, the light is incident on the light-irradiated portion 7 at a relatively narrow angle to the optical axis, of the imaging optical system, in perpendicular to the conveying direction. While, regarding the total reflection face 5*b*, light mainly from the light sources 4*b* is incident, and because the light is incident at an angle of 60-64 degrees to the normal of the total reflection face 5*b*, the light is incident on the light-irradiated portion 7 at a relatively wide angle to the optical axis of the imaging optical system.

Similarly, regarding the total reflection face 5*c*, light mainly from the light sources 4*c* is incident, and because the light is incident at an angle of 45-49 degrees to the normal of the total reflection face 5*c*, the light is incident on the light-irradiated portion 7 at a relatively narrow angle to the optical axis of the imaging optical system. Regarding the total reflection face 5*d*, light mainly from the light sources 4*d* is incident, and because the light is incident at an angle of 60-64 degrees to the normal of the total reflection face 5*d*, the light is incident on the light-irradiated portion 7 with a relatively wide angle to the optical axis of the imaging optical system. Here, by simultaneously driving the light sources 4*a* and 4*c* in sets, and the light sources 4*b* and 4*d* in sets, the light-irradiated portion 7 is irradiated with light from both sides in the sub-scanning direction.

Figure 10:
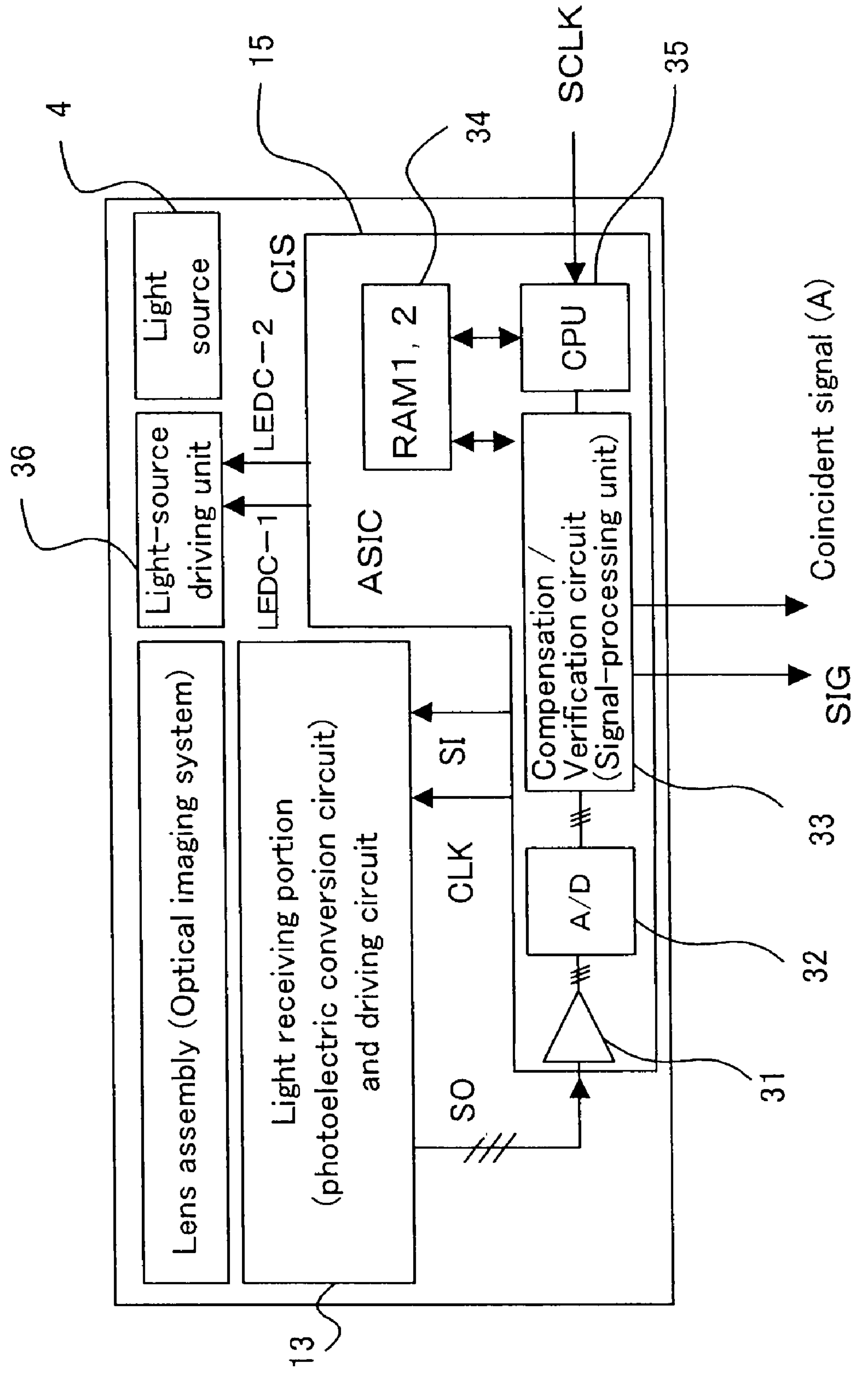
FIG. 10 is a block diagram of the image reading device according to Embodiment 1 of the present invention.

FIG. 10 is a block diagram of the image reading device according to Embodiment 1 of the present invention. Numeral 31 denotes an amplifier for amplifying signals obtained by photoelectric conversion in the sensor ICs 13; numeral 32 denotes an analog-to-digital converter (A/D converter) for analog-to-digital converting the amplified photoelectric-conversion output; numeral 33 denotes a compensation/verification circuit (signal processor) for signal-processing the converted digital output for each of color wavelengths passing through the RGB filters; numeral 34 denotes a RAM for storing image information for each of color components; numeral 35 denotes a CPU for transmitting a control signal and for processing signals; and numeral 36 denotes a light-source driving circuit (light-source driving unit, lighting control means) for driving the light sources 4.

Next, an operation of the image reading device according to Embodiment 1 of the present invention is explained. In FIG. 10, based on a system clock (SCLK) signal, a clock (CLK) signal for the signal processing IC (ASIC) 15 and a start signal (SI) synchronizing therewith are outputted to the sensor IC 13; thus, in accordance with the timing, a continuous analog signal (SO) for each of pixels (n) is outputted for each of reading lines (m) from the sensor IC 13. In the example represented in FIG. 8, the analog signal for 3,744 pixels is sequentially outputted.

The analog signal (SO) is amplified by the amplifier 31, A/D-converted to the digital signal by the A/D converter 32, and then the outputted signal for each pixel (bit) after the A/D conversion is processed by the compensation circuit 33 for performing shading compensation and total-bit compensation. The compensation is performed by reading out, from the RAM 34 (RAM1 data), compensation data memorized therein, which has been previously obtained by homogenizing data read from a reference test chart such as a white sheet, and by calculating and processing the A/D-converted digital signal corresponding to the image information. Such sequential operation is controlled by the CPU 35. The compensation data is used for compensating the sensitivity variations among the sensor ICs 13, and the non-uniformity among the light sources 4.

Figure 11:
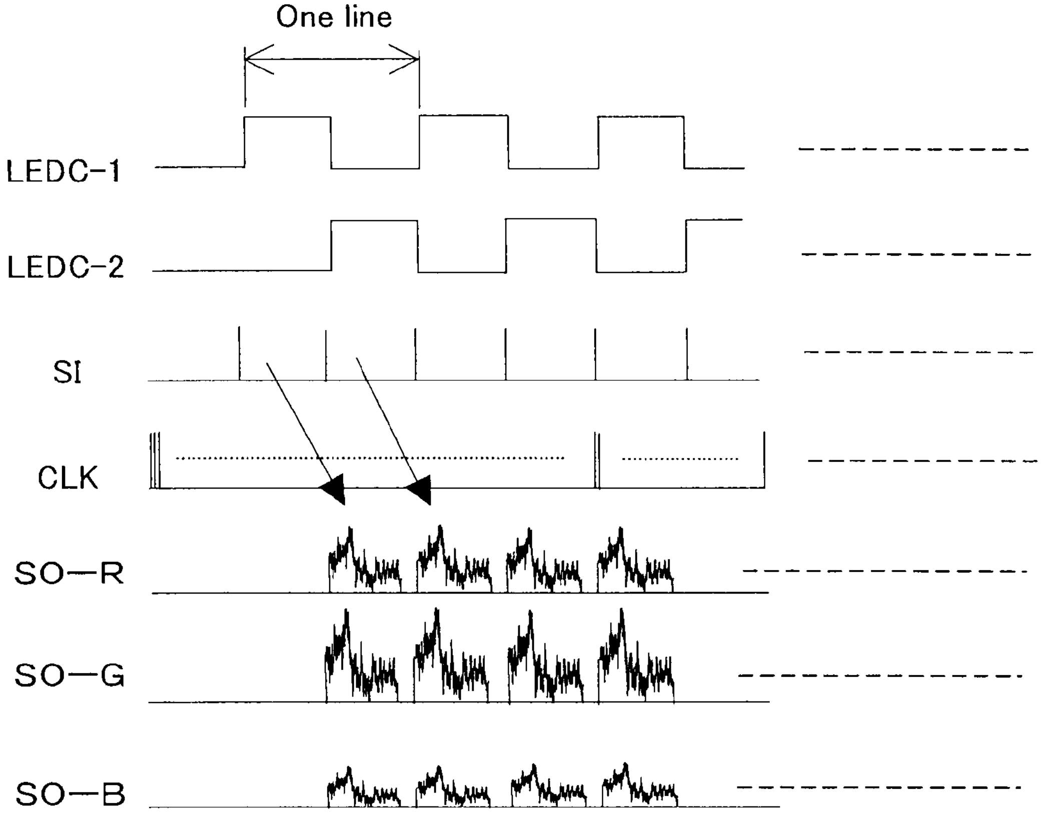
FIG. 11 represents a driving timing chart of the image reading device according to Embodiment 1 of the present invention.

Next, a driving sequence of the image reading device according to Embodiment 1 is explained using FIG. 11. In FIG. 11, the ASIC 15 switches a light-source lighting signal (LEDC-1) on (close) for 0.15 ms period in synchronization with the operation of the CPU 35; according to the switch-on, due to the light-source driving circuit 36 supplying electric power to the light sources 4*a* and 4*c*, the light sources 4*a* and 4*c* emit white light. While emitting light, the start signal (SI) synchronizing with the CLK signal continuously driven sequentially switches on the output of the shift register, for each element (pixel), which constitutes the driving circuit (RGB driving circuit) of the sensor IC 13, and its corresponding switching set sequentially switches its common line (SO) on/off, whereby, RGB image information (represented by SO-R, SO-G, and SO-B) synchronizing with CLK can be obtained.

Then, a light-source lighting signal (LEDC-2) is turned on (dose) for a period of 0.15 ms, the light-source driving circuit 36 supplies electric power to the light sources 4*b* and 4*d*, and resultantly, the light sources 4*b* and 4*d* emit white light. The start signal (SI) sequentially switches on the output of the shift register, for each element, which constitutes the driving circuit of the sensor ICs 13, and its corresponding switching set sequentially switches its common line (SO) on/off, whereby, RGB image information (image output) synchronizing with CLK can be obtained.

As described above, the image output based on the lighting of LEDC-1 and LEDC-2 is regarded as one-line image output read out during a period of approximately 0.3 ms. For example, because when the conveying speed is 250 mm/sec, the movement amount of the target 1 is approximately 75 μm for a period of 0.3 ms, the sensor recognizes approximately the same image from different illumination angles with respect to the imaging optical system.

Here, regarding the light-source lighting signal, when one of the sets of the light sources 4*a* and 4*c* and of the light sources 4*b* and 4*d* is lighted on, the other set is made to be lighted off; however, if control is performed by varying their light exposure ratio, the target 1 may be read out with both sets of the light sources being simultaneously lighted on.

Moreover, regarding the light sources 4, the light sources 4*a* and 4*b* have been arranged on one side, while the light sources 4*c* and 4*d* have been arranged on the other side; however, when high-speed reading is not needed, or the conveying means is configured to be highly-accurate, the light sources may be arranged only on one side, and the light-irradiated portion 7 may be irradiated from this side while changing the illumination angle.

Next, hologram reading is explained. Generally, in an image including no hologram regions, even if image reading is performed by light incident at various illumination angles, the intensity of light reflected by the target 1 only relatively varies in the digital output waveforms of the pixel rows. For example, the envelope shapes whose lines each are obtained by connecting the peak values of each pixel row agree with each other. That is, an outputted value of light emitted from a light source with a relatively narrow angle with respect to the optical axis (axis from the light-irradiated portion 7 toward the center of the light incident region of the imaging optical system) tends to be relatively large, while that at a relatively wide angle tends to be relatively small.

Figure 12:
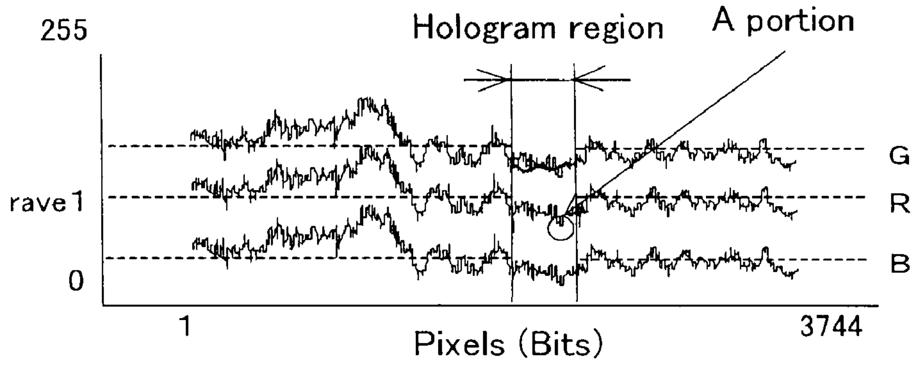
FIG. 12 is views representing image output waveforms for a document including a hologram region, in which FIG. 12(*a*) represents pixel digital-output values when light is incident with a wide angle, while FIG. 12(*b*) represents pixel digital-output values when light is incident with a narrow angle.
Figure 12:
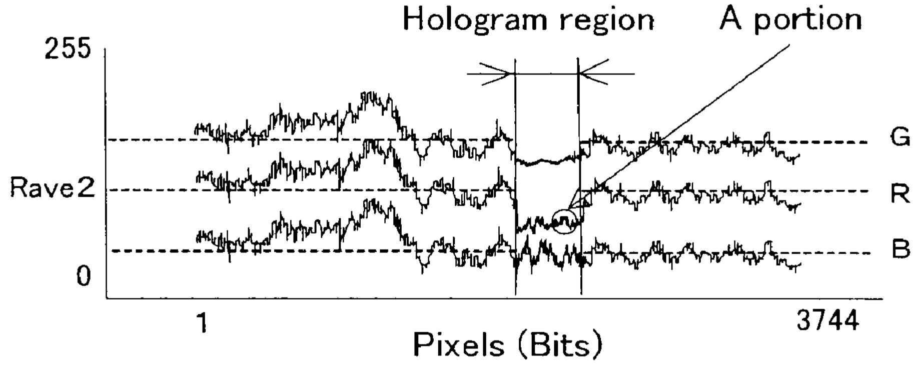

FIG. 12 is an example of image output waveforms for the document 1 including a hologram region, in which FIG. 12(*a*) represents digital output values with respect to a pixel row light-irradiated at the wide angle, while FIG. 12(*b*) represents that at the narrow angle. In the hologram region, output waveforms quite different from each other are found to be obtained. However, for a region other than the hologram region, although the output values vary, regarding the envelope shapes, only their relative output values vary.

Figure 13:
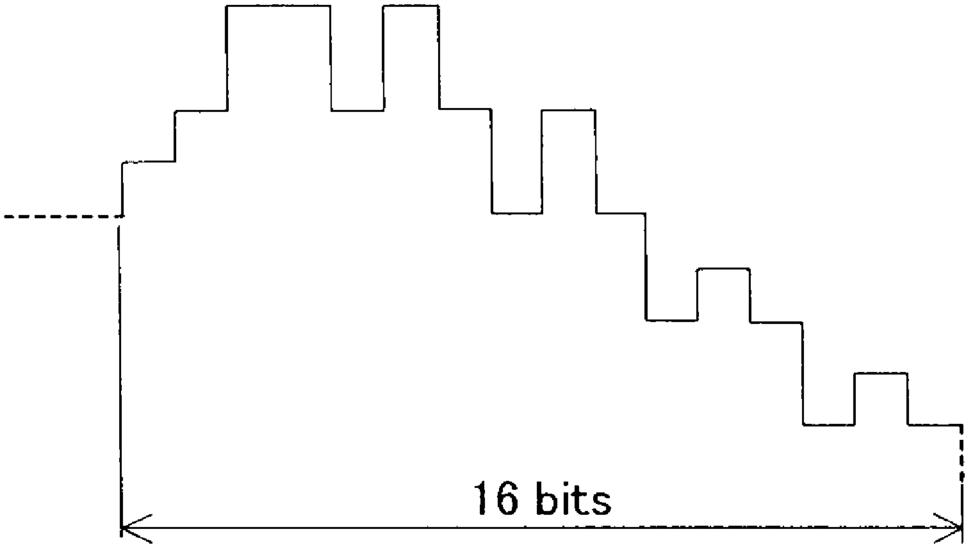
FIG. 13 is a graph for explaining 16-bit output values of a pixel row at a portion of the hologram region.
Figure 14:
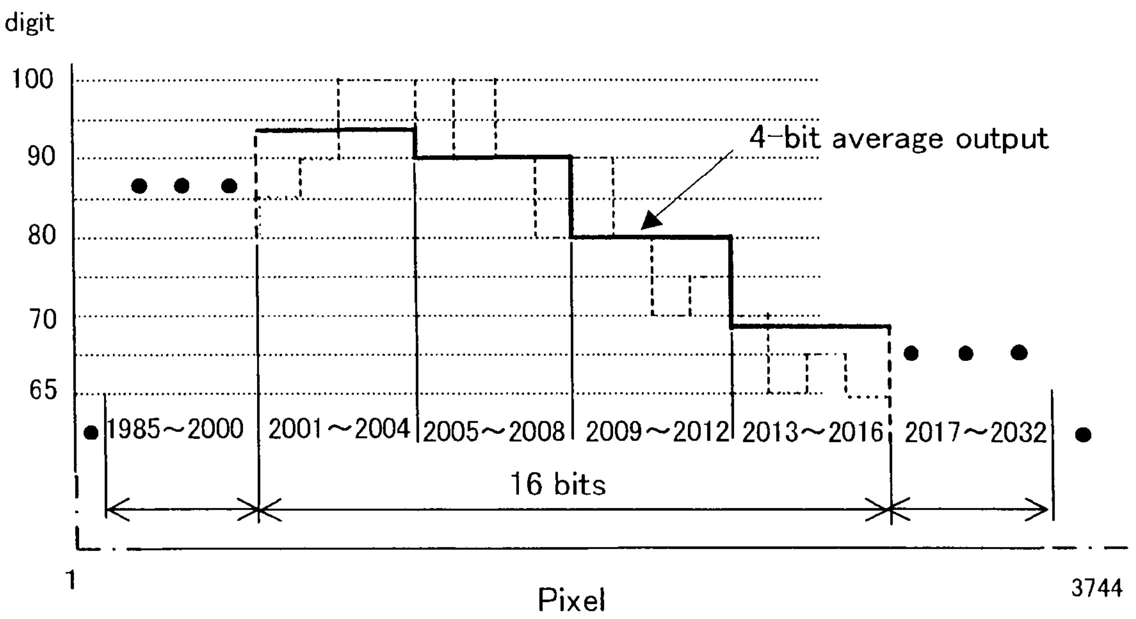
FIG. 14 is a graph for explaining output values obtained by averaging the digital output values for each 4-bit unit.

Next, a verification method for the target to be light-irradiated in the hologram region is explained. FIG. 13 represents 16-bit output values of the pixel row at a portion A as the hologram region represented in FIG. 12. FIG. 14 represents digital output values that are obtained by simply averaging for each 4-bit unit the digital output values represented in FIG. 13. A case is explained in which the verification is performed based on this averaged output data.

Regarding the document 1 including a hologram region, because the verification is performed after the averaging has been performed for each 4-bit unit, in a case of 3744 pixels, data for 936 bits is verified. The operation is performed by comparing and verifying it with hologram data, for each line, previously stored in the RAM 34 (RAM2 data).

With respect to a rough hologram image, because the pixel density is changed to 300 DPI using a CNT switching function of the sensor ICs 13, data for 468 bits is resultantly verified.

Moreover, when color image reading is performed, because output for each of R, G, and B components can be obtained, only any one of output information item may be utilized and verified for the verification.

Regarding the verification region, a verification method in which, after difference between data recognized by the wide-angle light and that by the narrow-angle light has been obtained, and then a hologram region has been obtained, the obtained data is verified with the RAM2 data for this region, and a method of comparing and verifying the data directly for the entire image region are considered. The former method is disclosed in detail in Patent Document 1, and therefore, a case in which the latter means is used is functionally explained next.

Figure 15:
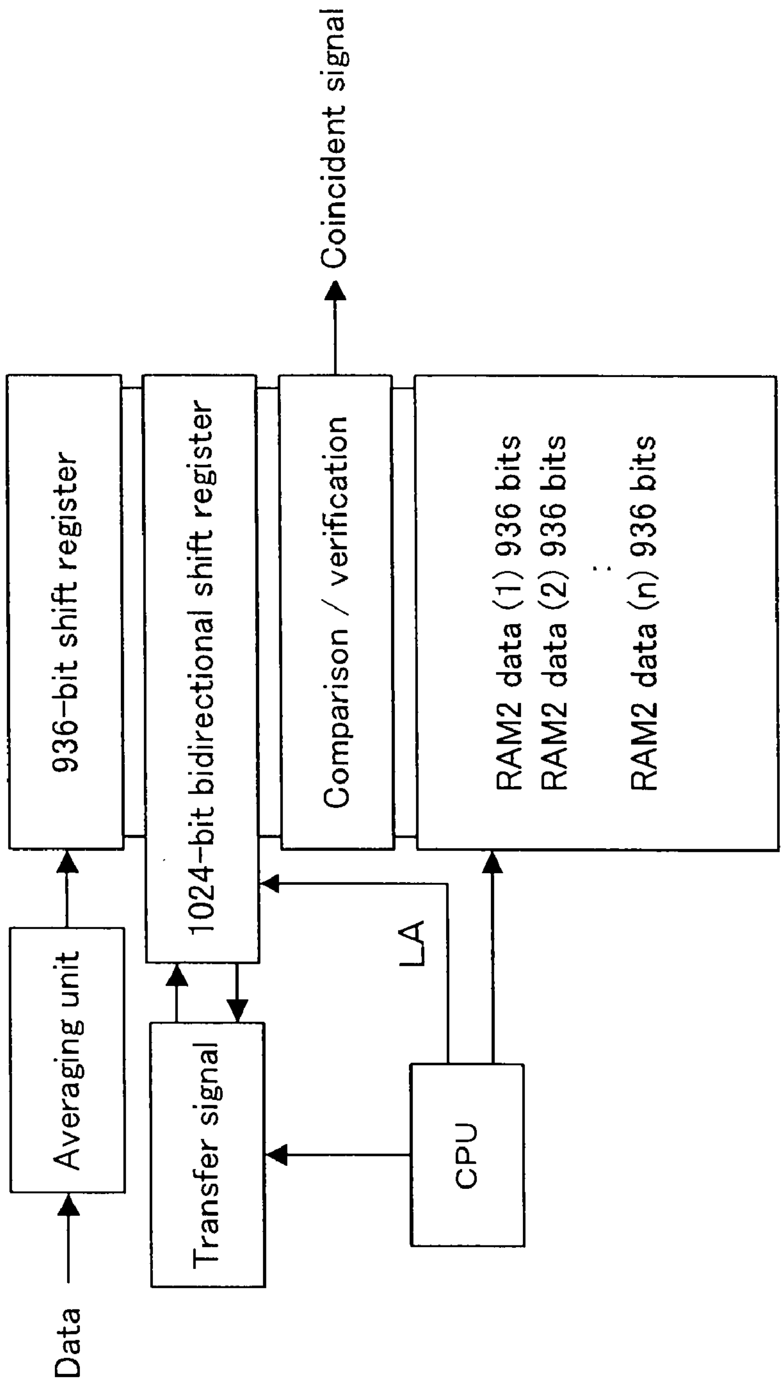
FIG. 15 is a block diagram for explaining a function of a signal processor installed in the image reading device according to Embodiment 1 of the present invention.

FIG. 15 is a functional block diagram for the signal processor 33. First, after a simple averaging calculation is performed by an averaging unit, data is stored in a 936-bit shift register. Next, in order to compare the image of the hologram region, the data is outputted to a 1024-bit bidirectional shift register, the image data stored in the bidirectional shift register is bidirectionally transmitted, and utilizing the next-line reading interval, the data is compared with RAM2 data (1).

This operation is performed for compensating displacement of the document 1, occurring due to conveying accuracy, in which the data collected by the 936-bit shift register is bidirectionally shifted and verified. When the verification result is coincident, transmission of the 1024-bit bidirectional shift register is stopped. That is, because the corresponding pixel position is specified by the number of shifts (transmission operations) of the 1024-bit bidirectional shift register, for the next line, data at the specified pixel position is transmitted to the shift register, and, after being latched (LA), the data is compared and verified with RAM2 data (2) on the next line of the RAM2 data. At this time, a coincident signal (A) may be transmitted to a reading system; however, similarly by comparing and verifying image data on the next of the next line with RAM2 data (3) to determine the result to be coincident output, a simple verification method can be obtained in which double verification is performed. Here, the verification region may be previously determined, and used for RAM2 data (n).

In the RAM2 data, values, as verification addition data and verification subtraction data, having a range of each of pixel data signals varying approximately +5 digits from a reference value of the RAM2 data are preferable to be stored. That is, in Embodiment 1, although the A/D converter 32 used was an 8-bit resolution and 256-step gradation one, which is used also for obtaining a highly-accurate hologram image, if only true/false determination of the hologram is needed, by determining, for example, at a level of 6-bit resolution and 64-step gradation, and then by comparing the obtained image data output values with those of the RAM2 data, verification with less error becomes possible.

Moreover, in Embodiment 1, although the absolute values of the pixel data output values have been averaged, and then verified, as another verification method, output values for pixels being adjacent to each other may be compared for verification.

As described above, in the image reading device according to Embodiment 1, light from plural rows of light sources, arranged in parallel on a face perpendicular to the conveying direction, for emitting the light in the sub-scanning direction is guided in the sub-scanning direction, the exposure ratio between the light amounts incident on the different total reflection faces of the light guide is controlled in time division, and the reflection light focused by the lens is received by the sensor for each divided time; therefore, because a plurality of illumination units is not individually needed, an effect is obtained that variation of hologram images can be detected in a short time.

Moreover, after light has been propagated in the sub-scanning direction inside the light guide, the target is illuminated from the total reflection face, of the light guide, close to the portion to be irradiated with light; therefore, an image reading device can be obtained in which a plane-shaped and compact illumination portion is mounted.

Embodiment 2

The light sources used in Embodiment 1 have been structured to emit light mainly in the sub-scanning direction; then, in Embodiment 2, a case is explained in which the light guide path of the light guide is separated.

Figure 16:
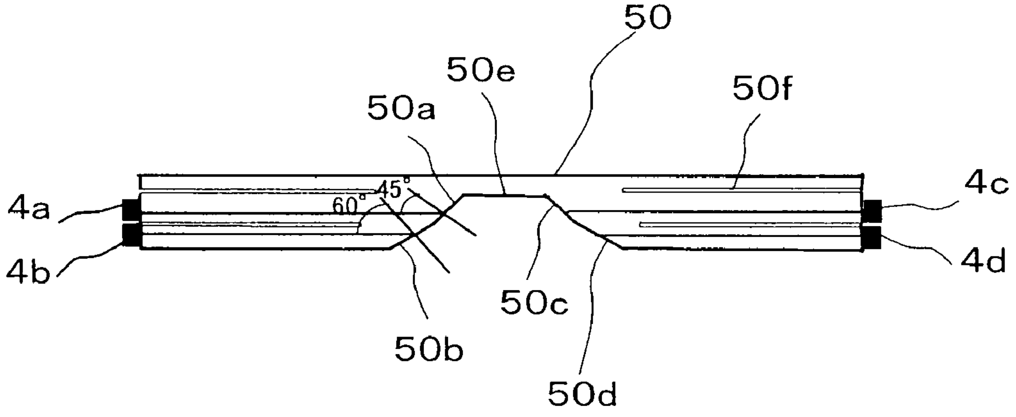
FIG. 16 is a cross-sectional view illustrating an illumination optical system of an image reading device according to Embodiment 2 of the present invention.

An image reading device according to Embodiment 2 of the present invention is explained using FIG. 16. FIG. 16 is a cross-sectional view illustrating the image reading device according to Embodiment 2. In FIG. 16, numeral 50 denotes a light guide; numeral 50*a* denotes a first reflection face in which the center of a total reflection face is positioned along the optical-axis center of the first light sources 4*a*; numeral 50*b* denotes a second reflection face in which the center of a total reflection face is positioned along the optical-axis center of the second light sources 4*b*; numeral 50*c* denotes a third reflection face in which the center of a total reflection face is positioned along the optical-axis center of the third light sources 4*c*; numeral 50*d* denotes a fourth reflection face in which the center of a total reflection face is positioned along the optical-axis center of the fourth light sources 4*d*; numeral 50*e* denotes a flat face for transmitting reflection light reflected by the light-irradiated portion 7; and numeral 50*f* denotes reflection walls (grooves) for separating light guide channels from the light sources 4.

Here, the total reflection faces 50*a*-50*d* and the flat face 50*e* are formed by cutting away a part of the light guide 50, close to the light-irradiated portion 7; hereinafter, this portion is referred to as a cutaway portion of the light guide 50. The total reflection faces 50*a* and 50*b* on one side and those 50*c* and 50*d* on the other side are in a plane-symmetrical relationship with each other. In this figure, the same numerals as those in FIG. 9 represent the same or equivalent elements. The other configurations are the same as those explained in Embodiment 1.

Light emitted from the light sources 4*a* in the sub-scanning direction and focused by the condenser lenses 23 propagates in the sub-scanning direction, and irradiates the light-irradiated portion 7 through the total reflection face 50*a* of the light guide 50; however, a part of the light component may also leak out to the side of the total reflection face 50*b*. Inversely, light emitted from the light sources 4*b* in the sub-scanning direction and focused by the condenser lenses 23 propagates in the sub-scanning direction, and irradiates the light-irradiated portion 7 through the total reflection face 50*b* of the light guide 50; however, a part of the light component may also leak out to the side of the total reflection face 50*a*.

Therefore, in order to separate the guide channels provided for guiding light emitted from the light sources 4*a* and 4*b*, by forming a groove, in the sub-scanning direction, at the boundary between the light guide channels from the light sources 4*a* and 4*b*, reflection walls whose specific dielectric constant is 1 are constructed. The channels provided for guiding light from the light sources 4*a* and 4*b* are separated by this boundary, and thus, with each light component being totally reflected by the reflection walls 50*f*, the light is irradiated on the light-irradiated portion 7 through each of total reflection faces 50*a* and 50*b*.

As a method of forming the reflection walls 50*f*, the light guide channel for guiding light from the light sources 4*a* and the total reflection face 50*a*, and the light guide channel from the light sources 4*b* and the total reflection face 50*b* may also be separately formed; moreover, by evaporating-and-depositing or printing-and-coating black paint on the separately formed faces contacting with each other, the separation may be achieved due to unnecessary light being absorbed.

As described above, by preventing interference of light emitted from a plurality of light sources and guided inside the light guide in parallel in the sub-scanning direction, control is performed in time division by the lighting control means after the exposure ratio between the light amounts from the total reflection faces 50*a* and 50*b* has been defined by the illuminance of each of light sources; therefore, an image varying in the hologram region can be accurately read out or determined to be true or false.

Embodiment 3

In Embodiment 1 and Embodiment 2, the image reading devices have been explained in which the light guides for guiding light in the sub-scanning direction and irradiating the portion of the target to be light-irradiated with light reflected by the total reflection faces, and the telecentric imaging optical systems are used; then, in Embodiment 3, a case is explained in which a rod lens array is used as the imaging optical system.

Figure 17:
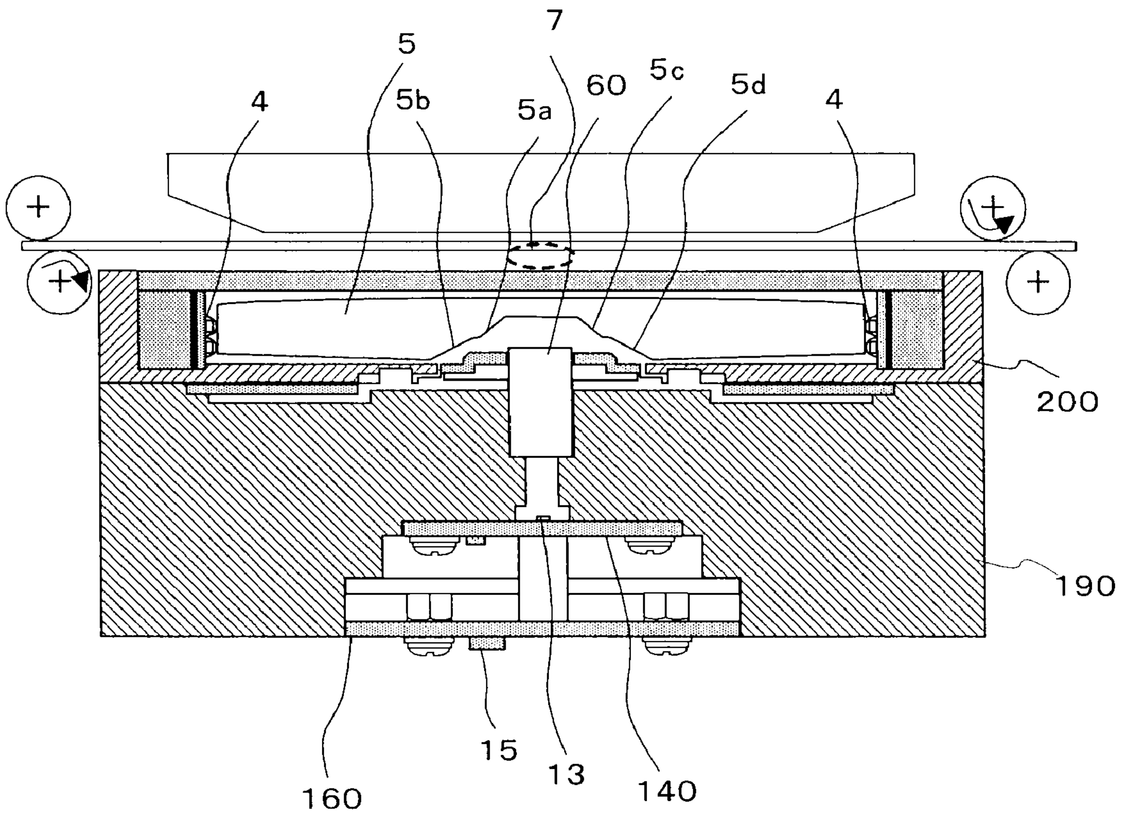
FIG. 17 is a cross-sectional view illustrating an image reading device according to Embodiment 3 of the present invention.

An image reading device according to Embodiment 3 of the present invention is explained using FIG. 17. FIG. 17 is a cross-sectional view illustrating the image reading device according to Embodiment 3. In FIG. 17, numeral 60 denotes a lens assembly imaging means) such as a rod lens array for focusing reflection light from the target 1; numeral 140 denotes a sensor board on which the sensor ICs 13 are mounted; numeral 160 denotes a signal processing board on which the ASICs 15, etc. are mounted; numeral 190 denotes a case in which an imaging optical system using the rod lens array 60 is installed; and numeral 200 denotes a case in which an illumination optical system (illumination unit) such as the light sources 4 and light guide 5 is installed. In the figure, the same numerals as those in FIG. 1 and FIG. 9 represent the same or equivalent elements.

Next, an operation is explained. In FIG. 17, light emitted from the light sources 4 arranged in the main-scanning direction, propagates in the sub-scanning direction inside the light guide 5, and illuminates, after totally reflected by the total reflection faces 5*a*-5*d*, the light-irradiated portion 7 of the target 1. Scattered light having been reflected by the target 1 is converged by the rod lens array 60, and then received by the sensor ICs 13. Analog signals obtained by photoelectric conversion by the sensor ICs 13 are signal-processed by the signal processing board 160 through the sensor board 140. The other functions are equivalent to those explained in Embodiment 1.

In Embodiment 3, because light receiving faces each corresponding to light incident on each of sensor ICs 13 are linearly arranged in a row, regarding the sensor board 140 and the signal processing board 160, respective single boards are applicable.

As describe above, in the image reading device according to Embodiment 3, an effect is obtained that a flat and compact image reading device can be obtained in which the illumination unit, where light emitted from the light sources propagates in the sub-scanning direction and illuminates the target through the total reflection faces of the light guide, and the imaging unit, where light, including information, incident from the target focuses thereon, are separated; moreover, the device can also be applied to a generalized image reading device (CIS) using a rod lens array or fiber lenses.

Embodiment 4

In Embodiment 1-Embodiment 3, the operations are mainly explained in which, by guiding light in the sub-scanning direction, and using the light guide for emitting light, having been reflected on the total reflection faces thereof, onto the portion, to be irradiated with light, of the target at the light angles different from each other, the image included in the hologram region is read out; then, in Embodiment 4, in addition to the hologram region, conveying-angle variation with respect to the target passing through the conveying path and conveying-position variation with respect to the direction of the optical axis in the imaging optical system are explained.

Figure 18:
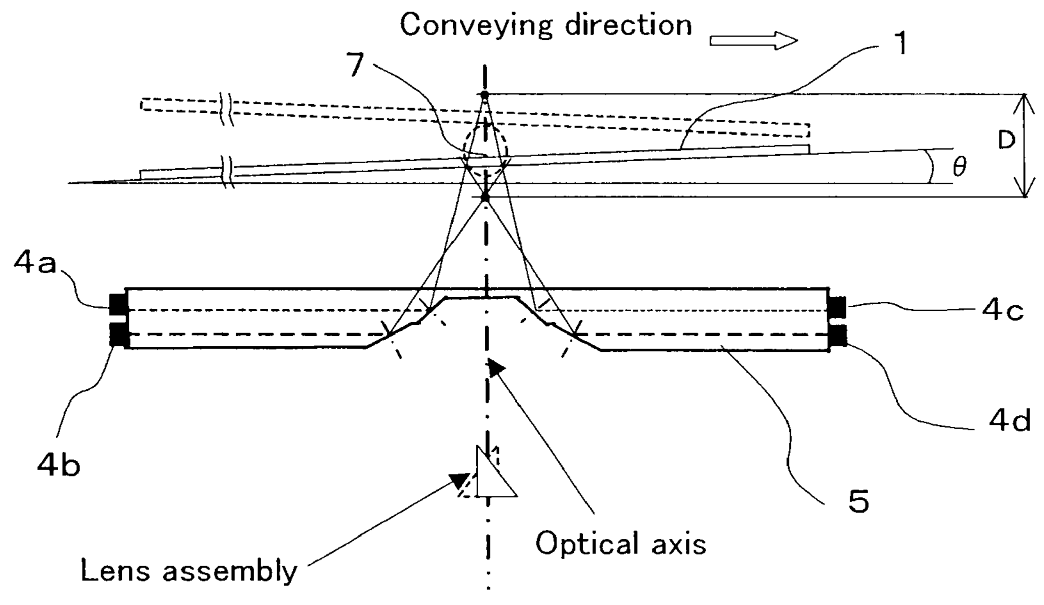
FIG. 18 is a cross-sectional view illustrating an illumination optical system of an image reading device according to Embodiment 4 of the present invention.

An image reading device according to Embodiment 4 of the present invention is explained using FIG. 18. FIG. 18 is a cross-sectional view illustrating an illumination optical system of the image reading device according to Embodiment 4. In FIG. 18, symbol θ denotes variation of the angle with respect to the conveying direction of the target 1; and symbol D denotes variation of the position with respect to a face in parallel to the conveying direction. Here, the same numerals as those in FIG. 9 represent the same or equivalent elements. In FIG. 18, one side of the light exiting from the light guide 5 is configured to be incident on the upper-limit position of the conveying path where the conveying variation or the conveying-position variation occurs, while the other side of the light is configured to be incident on the lower-limit position of the conveying path. That is, normal lines of the respective total reflection faces of the light guide 5 are configured to cross at points, different from each other, on the optical axis of the lens assembly through which the focusing light passes.

As described above, according to the image reading device of Embodiment 4, when the image included in the hologram region is read out, similarly to Embodiment 1, light from plural rows of light sources, arranged in parallel on a face perpendicular to the conveying direction, for emitting the light in the sub-scanning direction is guided in the sub-scanning direction, the exposure ratio between the light amounts incident on the different total reflection faces of the light guide is controlled in time division, and the reflection light focused by the lens is received by the sensor for each time division; therefore, because a plurality of illumination unit is not individually needed, an effect is obtained that variation of hologram images can be detected in a short time. Additionally, because intersection points where the normal lines of the respective total reflection faces of the light guide 5 cross are present at different positions on the optical axis of the lens assembly, even if the conveying variation of the target 1 occurs, regarding the light exiting at different angles, the light is spread in the light-irradiated portion 7 and complemented so that the light intensity in the area of the light-irradiated portion 7 is averaged; therefore, occurrence of image-quality irregularity caused by the conveying system can be prevented.

This device is not limited to the reading of holograms, and can also be applied to a generalized image reading device (CIS) used for general image reading, in which the time-division control of light irradiation from different irradiation angles is unnecessary.

What is claimed is:

1. An image reading device comprising:

conveying means for conveying in a conveying direction a target to be light-irradiated including a hologram region;

a light guide extending in a main-scanning direction and a sub-scanning direction;

a first light source, provided at an end portion of the light guide, in which light sources are arranged in an array along the main-scanning direction, for emitting light having a plurality of wave lengths in the sub-scanning direction into the light guide;

a second light source, provided at an end portion of the light guide, in which light sources are arranged in an array in the main-scanning direction along the arrangement of the first light source, for emitting light having a plurality of wave lengths in the sub-scanning direction into the light guide;

a first total reflection face, formed at a position where optical axes of the first light source intersect with the light guide, for totally reflecting light emitted from the first light source in the sub-scanning direction to a light irradiated portion where the hologram region is to be irradiated with light;

a second total reflection face, having a slant angle different from that of the first total reflection face, formed at a position where optical axes of the second light source intersect with the light guide, for totally reflecting light emitted from the second light source in the sub-scanning direction to the portion to be irradiated with light;

lighting control means for controlling in a time-division manner an exposure ratio between light quantities incident on the first total reflection face and the second total reflection face;

a lens assembly for focusing reflection light reflected by a reflective portion of the target positioned at the light irradiated portion; and a sensor for receiving, for each divided time, light focused by the lens assembly, the light irradiated portion being irradiated with light from the first total reflection face and the second total reflection face by their irradiation angles being different from each other.

2. An image reading device as recited in claim 1, wherein the first total reflection face and the second total reflection face extend in the main-scanning direction, respectively.

3. An image reading device as recited in claim 1, wherein the light guide includes separation means, formed in the sub-scanning direction toward the first total reflection face and the second total reflection face from the end portions, in the main scanning direction, at which the first light source and the second light source are formed, for optically separating the optical axes of the first light source arranged in the array and those of the second light source arranged in the array.

4. An image reading device as recited in claim 1, wherein the light guide is configured with different members in which the optical axes of the first light source arranged in the array and those of the second light source arranged in the array are optically separated.

5. An image reading device as recited in claim 1, wherein the light guide includes a cutaway portion having the first and the second total reflection faces and a flat face for transmitting therethrough the reflection light reflected by the light irradiated portion.

6. An image reading device comprising:

conveying means for conveying in a conveying direction a target to be light-irradiated including a hologram region;

a light guide extending in a main-scanning direction and a sub-scanning direction;

a first light source, provided at an end portion of the light guide in a front side of the conveying direction, in which light sources are arranged in an array along the main-scanning direction, for emitting light having a plurality of wave lengths in the sub-scanning direction into the light guide;

a second light source, provided at an end portion of the light guide in the front side of the conveying direction, in which light sources are arranged in an array in the main-scanning direction along the arrangement of the first light source, for emitting light having a plurality of wave lengths in the sub-scanning direction into the light guide;

a first total reflection face, formed at a position where optical axes of the first light source intersect with the light guide, for totally reflecting light emitted from the first light source in the sub-scanning direction to a light irradiated portion where the hologram region is to be irradiated with light;

a second total reflection face, having a slant angle different from that of the first total reflection face, formed at a position where optical axes of the second light source intersect with the light guide, for totally reflecting light emitted from the second light source in the sub-scanning direction to the portion to be irradiated with light;

a third light source, provided at an end portion of the light guide in a rear side of the conveying direction, in which light sources are arranged in an array along the main-scanning direction, for emitting light having a plurality of wave lengths in the sub-scanning direction into the light guide;

a fourth light source, provided at an end portion of the light guide in the rear side of the conveying direction, in which light sources are arranged in an array in the main-scanning direction along the arrangement of the third light source, for emitting light having a plurality of wave lengths in the sub-scanning direction into the light guide;

a third total reflection face, formed at a position where optical axes of the third light source intersect with the light guide, for totally reflecting light emitted from the third light source in the sub-scanning direction to the portion to be irradiated with light;

a fourth total reflection face, having a slant angle different from that of the third total reflection face, formed at a position where optical axes of the fourth light source intersect with the light guide, for totally reflecting light emitted from the fourth light source in the sub-scanning direction to the portion to be irradiated with light;

lighting control means for controlling in a time-division manner exposure ratios among light quantities incident on the first total reflection face, the second total reflection face, the third total reflection face, and the fourth total reflection face;

a lens assembly for focusing reflection light reflected by a reflective portion of the target positioned at the portion to be light-irradiated; and a sensor for receiving, for each divided time, light focused by the lens assembly, the portion to be light-irradiated being irradiated with light from the first total reflection face and the second total reflection face by their irradiation angles being different from each other, and being irradiated with light from the third total reflection face and the fourth total reflection face by their irradiation angles being different from each other.

7. An image reading device as recited in claim 6, wherein the first total reflection face, the second total reflection face, the third total reflection face, and the fourth total reflection face extend in the main-scanning direction, respectively.

8. An image reading device as recited in claim 6, wherein the light guide includes:

first separation means, formed in the sub-scanning direction toward the first total reflection face and the second total reflection face from the end portions, in the main scanning direction, at which the first light source and the second light source are formed, for optically separating the optical axes of the first light source arranged in the array and those of the second light source arranged in the array, and second separation means, formed in the sub-scanning direction toward the third total reflection face and the fourth total reflection face from the end portions, in the main scanning direction, at which the third light source and the fourth light source are formed, for optically separating the optical axes of the third light source arranged in the array and those of the fourth light source arranged in the array.

9. An image reading device as recited in claim 6, wherein the light guide is configured with different members in which the optical axes of the first light source arranged in the array and those of the second light source arranged in the array are optically separated, and the optical axes of the third light source arranged in the array and those of the fourth light source arranged in the array are optically separated.

10. An image reading device as recited in claim 6, wherein the light guide is configured in a relationship that the first total reflection face and the second total reflection face are plane-symmetrical to the third total reflection face and the fourth total reflection face, respectively.

11. An image reading device as recited in claim 6, wherein the light guide includes a cutaway portion having the first, second, third and fourth total reflection faces, and a flat face for transmitting therethrough the reflection light reflected by the portion to be light-irradiated.

12. An image reading device comprising:

a light guide extending in a main-scanning direction and a sub-scanning direction;

a first light source, provided at an end portion of the light guide, in which light sources are arranged in an array along the main-scanning direction, for emitting light having a plurality of wave lengths in the sub-scanning direction into the light guide;

a second light source, provided at an end portion of the light guide, in which light sources are arranged in an array in the main-scanning direction along the arrangement of the first light source, for emitting light having a plurality of wave lengths in the sub-scanning direction into the light guide;

a first total reflection face, formed at a position where optical axes of the first light source intersect with the light guide, for totally reflecting light emitted from the first light source in the sub-scanning direction to a portion, of a target to be light-irradiated, to be irradiated with light;

a second total reflection face, having a slant angle different from that of the first total reflection face, formed at a position where optical axes of the second light source intersect with the light guide, for totally reflecting light emitted from the second light source in the sub-scanning direction to the portion to be irradiated with light;

a lens assembly for focusing reflection light reflected by a reflective portion of the target positioned at the portion to be light-irradiated; and a sensor for receiving light focused by the lens assembly, the portion to be light-irradiated being irradiated with light from the first total reflection face and the second total reflection face by their irradiation angles being different from each other.

13. An image reading device comprising:

conveying means for conveying along a conveying path a target to be light-irradiated;

a light guide extending in a main-scanning direction and a sub-scanning direction;

a first light source, provided at an end portion of the light guide, in which light sources are arranged in an array along the main-scanning direction, for emitting light having a plurality of wave lengths in the sub-scanning direction into the light guide;

a second light source, provided at an end portion of the light guide, in which light sources are arranged in an array in the main-scanning direction along the arrangement of the first light source, for emitting light having a plurality of wave lengths in the sub-scanning direction into the light guide;

a first total reflection face, formed at a position where optical axes of the first light source intersect with the light guide, for totally reflecting light emitted from the first light source in the sub-scanning direction to a portion, of the target, to be irradiated with light;

a second total reflection face, having a slant angle different from that of the first total reflection face, formed at a position where optical axes of the second light source intersect with the light guide, for totally reflecting light emitted from the second light source in the sub-scanning direction to the portion to be irradiated with light;

a lens assembly for focusing reflection light reflected by a reflective portion of the target positioned at the portion to be light-irradiated; and a sensor for receiving light focused by the lens assembly, the portion to be light-irradiated, being irradiated with light from the first total reflection face and the second total reflection face by their irradiation angles being different from each other, having a predetermined region occurring by a conveying blur or a conveying position shift of the target in a direction of optical axes of the lens assembly through which focused light passes, the second light source emitting light through the second total reflection face onto a region, near the light guide, in the predetermined region, and the first light source emitting light through the first total reflection face onto a region, far from the light guide, in the predetermined region.

* * * * *